No. 682,983. Patented Sept. 17, 1901.
H. A. FRANTZ.
MOTOR VEHICLE.
(Application filed June 20, 1900.)
(No Model.) 3 Sheets—Sheet 1.

No. 682,983. Patented Sept. 17, 1901.
H. A. FRANTZ.
MOTOR VEHICLE.
(Application filed June 20, 1900.)
(No Model.) 3 Sheets—Sheet 3.

Witnesses
Hiram A. Frantz
Inventor
Attorney

UNITED STATES PATENT OFFICE.

HIRAM A. FRANTZ, OF ALLENTOWN, PENNSYLVANIA, ASSIGNOR OF ONE-HALF TO WILLIAM A. WIEDER, OF CEMENTON, PENNSYLVANIA.

MOTOR-VEHICLE.

SPECIFICATION forming part of Letters Patent No. 682,983, dated September 17, 1901.

Application filed June 20, 1900. Serial No. 20,915. (No model.)

*To all whom it may concern:*

Be it known that I, HIRAM A. FRANTZ, a citizen of the United States of America, and a resident of Allentown, in the county of Lehigh and State of Pennsylvania, have invented certain new and useful Improvements in Motor-Vehicles, of which the following is a specification.

My invention relates to motor-vehicles; and it consists particularly in certain improvements in the operating mechanism for transmitting power from the motor to the running-gear and in other novel features of construction, as fully described in connection with the accompanying drawings and specifically pointed out in the claims.

Figure 1:
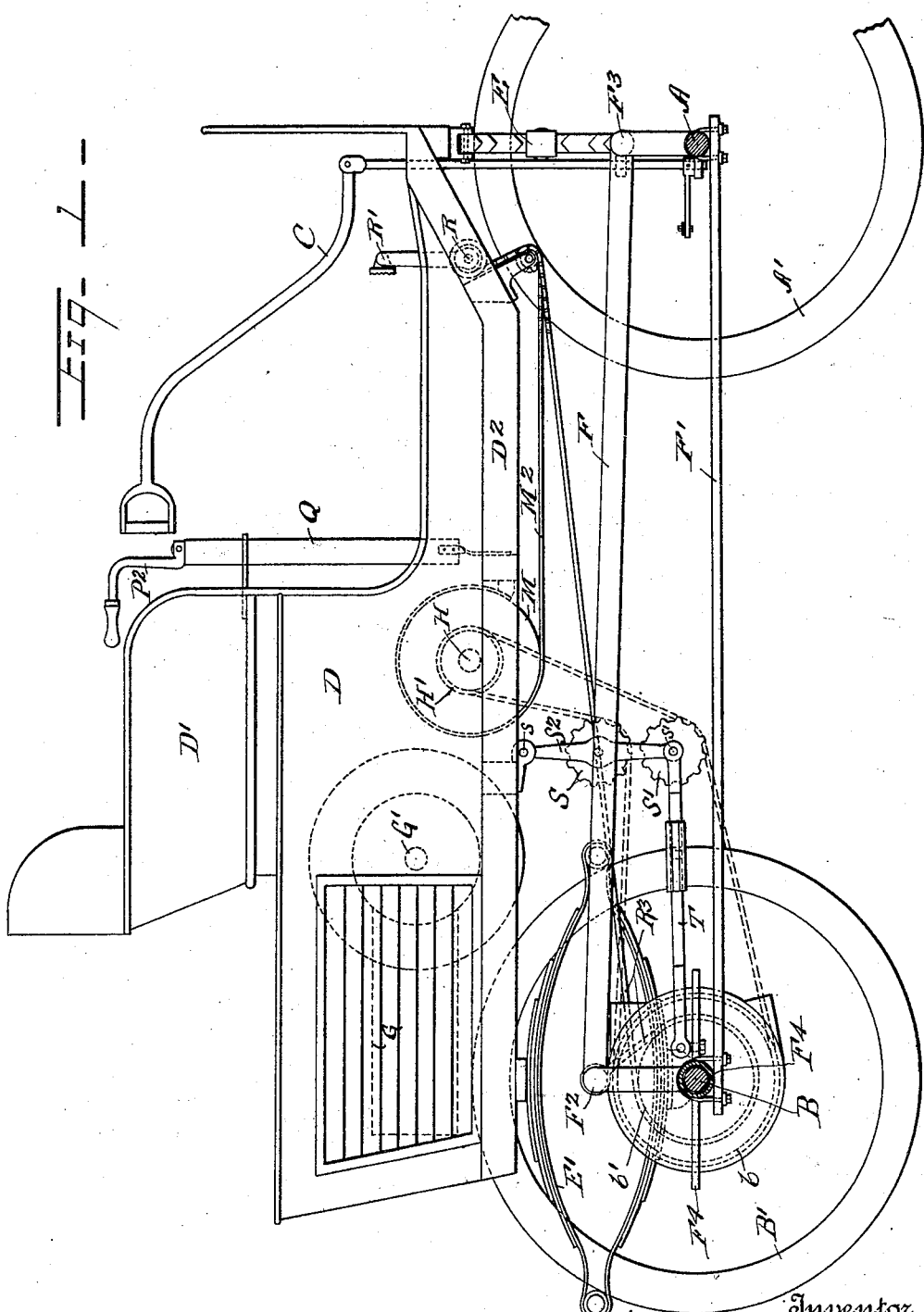
Figure 2:
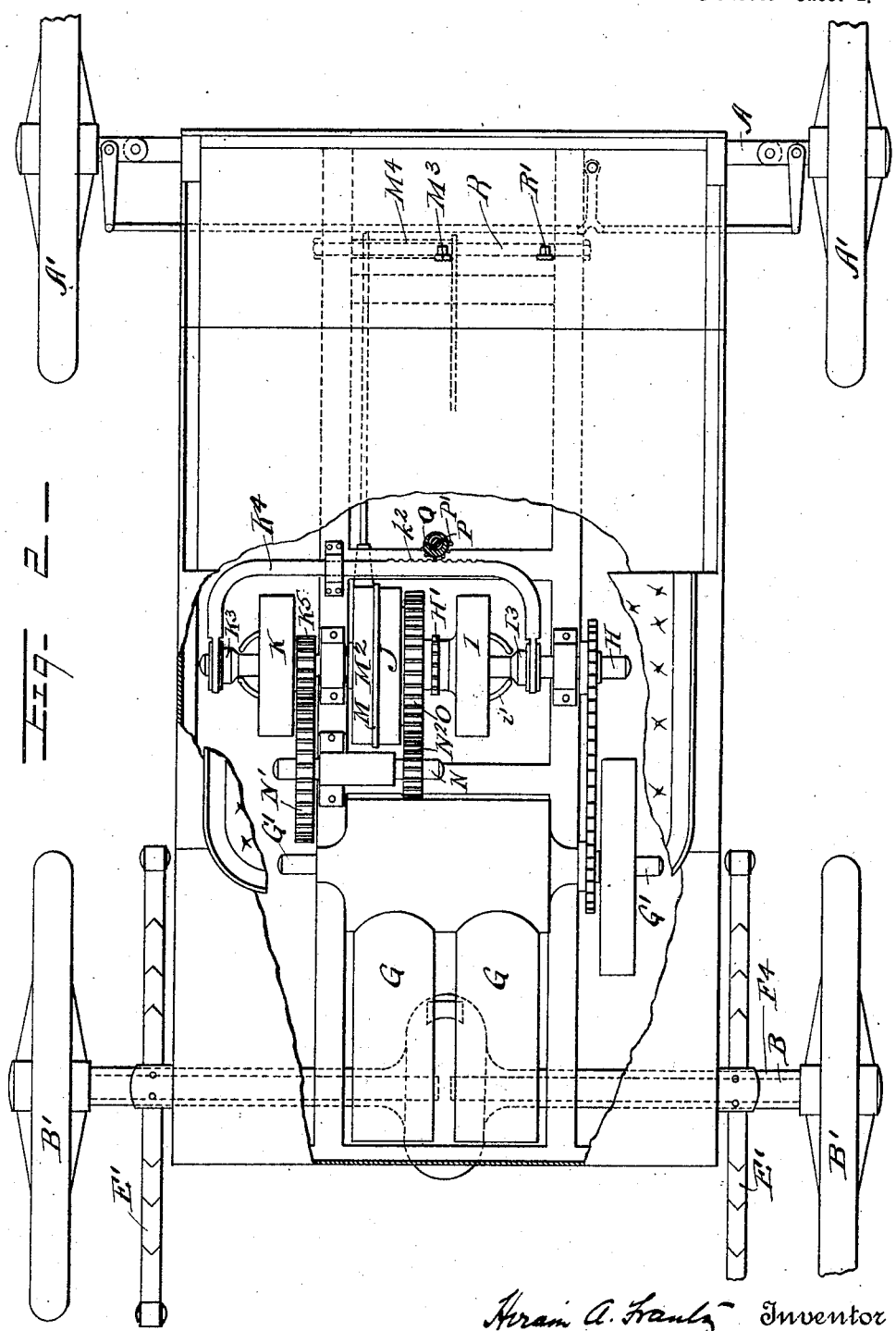
Figure 3:
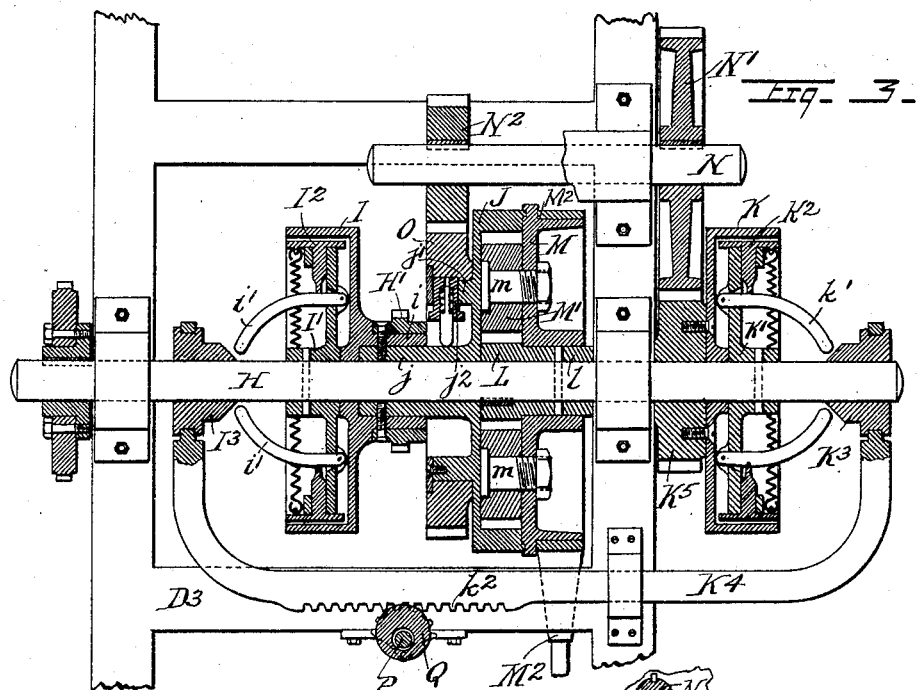
Figure 4:
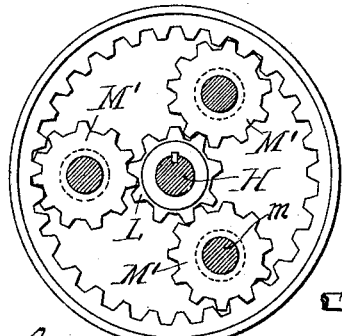
Figure 5:
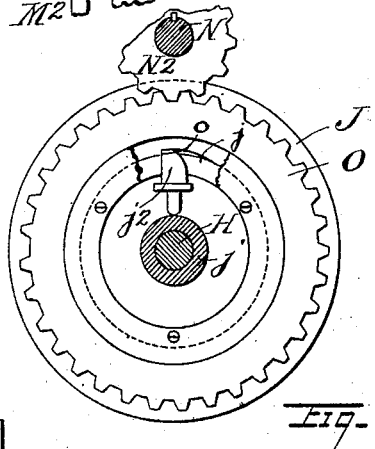
Figure 6:
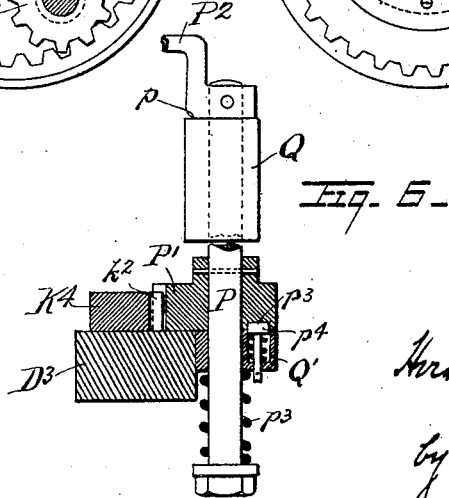

Figure 1 is a side elevation of a vehicle embodying my improvements. Fig. 2 is a plan view showing a portion of the vehicle-body cut away, so as to show more clearly the general arrangement of the operating mechanism. Fig. 3 is a sectional plan view of the variable-speed and reversing mechanism to an enlarged scale. Figs. 4 and 5 are detail views of the planet-gear and pawl-gear, respectively, each of which forms part of said mechanism. Fig. 6 is an enlarged sectional view of a portion of the clutch-operating means of said mechanism.

A represents a non-rotative front axle, and B a rotative driving-axle at the rear, of a motor-vehicle, and A' and B', respectively, the front steering-wheels and rear driving-wheels thereon. The front wheels are loosely mounted on pivoted axle arms or spindles in such manner as to permit of their being turned for steering by means of any suitable steering mechanism, including a lever C, and the driving-wheels B' are fixed to the rear axle, which is mounted in a fixed casing $F^4$ and rotated, as indicated, by means of a sprocket-wheel $b$, fixed thereto and operated by a chain extending to the driven shaft H of the motor mechanism.

The body D of the vehicle, which may be of any suitable design, is formed, as shown, with a box portion between the seat D' and the floor-sills $D^2$, and the latter are carried above the axles on springs E and E' at front and rear, respectively. The front springs E rest upon a cross-bar $F^3$, which is located above and rigidly connected to the axle A, and the rear springs E' rest upon the fixed casing $F^4$. The latter extends around the sprocket-wheel $b$ on the axle B and also around the brake-wheel $b'$ thereon, which will be referred to hereinafter, and is rigidly connected with the front axle A and its upper cross-bar $F^3$ by longitudinal bars F and F' on each side of the longitudinal center line of the vehicle, the cross-bar $F^2$ above the rear axle, to which the longitudinal bars F are fixed, forming practically part of the fixed axle-casing $F^4$, which is thus rigidly connected with the fixed front axle.

Within the box portion D of the body is located any suitable motor, (indicated at G,) the crank-shaft G' of which is arranged to drive a parallel shaft H, which carries a sprocket-wheel H', having a chain connection with the sprocket-wheel $b$ on the rear driving-axle of the vehicle. In connection with said sprocket-wheel H' and the suitably-mounted shaft H, I provide an improved regulating and reversing mechanism, which I will now describe, referring particularly to Fig. 3.

The sprocket-wheel H', already referred to, is fixed to the overlapping hub or neck portions $i$ and $j$ of a clutch-wheel I and an interiorly-toothed wheel J, which are loosely mounted on the shaft H and are united by said sprocket-wheel so that all will rotate together. Fixed to the shaft H, adjacent to its opposite ends, are similar hubs I' and K', carrying radially-slidable friction-shoes $I^2$ and $K^2$, either of which is adapted to be forced outward into engagement, respectively, with the clutch-wheel I, already referred to, or the similar one, K, near the opposite end of the shaft, by means of one or other of the sliding conical sleeves $I^3$ and $K^3$, which are moved jointly upon the shaft H by means of a suitably-operated connecting-rod $K^4$, so as to spread either the shoe-levers $i'$ or $k'$, according as the direction of the movement is toward one or the other. In addition to these clutch-hubs I' and K' there is also fixed to the shaft H at an intermediate point a pinion-wheel L, which meshes with a series of planet-wheels M' M', loosely mounted upon axes $m$ $m$ and also meshing with the internally-toothed wheel J. These axes $m$ $m$ and the planet-wheels thereon are carried by a brake-band wheel or drum M, which is loosely mounted upon the hub $l$ of the pinion L.

The loosely-mounted clutch-wheel K, already described, carries a toothed wheel $K^5$, which meshes with a wheel N' on a countershaft N, and another wheel $N^3$ on the latter meshes with an externally-toothed ring O, which is rotatably mounted upon an annular projection $j'$ on the internally-toothed wheel J, with which it has a pawl-and-ratchet engagement, as indicated by $j^2$ and $o$, Figs. 3 and 5, whereby said wheel J may be rotated by it in one direction only.

The mechanism for operating the conical sliding sleeves $I^3$ and $K^3$ to throw one or other of the clutch-wheels I or K into gear with the shaft H consists of a vertical shaft P, rotatably mounted in a standard Q on the cross-sill $D^3$ and provided at its lower end with a fixed pinion P', adapted to mesh with a rack $k^2$, formed on the sleeve-connecting rod $K^4$, and at its projecting upper end with a handle $P^2$, pivoted thereto and adapted to fulcrum at a point $p$ on the top of the standard Q, so that a downward pressure on said handle will raise the shaft P and its pinion P' vertically against a spring $p^3$ sufficiently to disengage said pinion from a spring-stop $p^2$, which is arranged to normally engage a recess $p^4$ in the pinion when the latter is moved to its middle position, the object of this construction being to provide an automatic stop adapted to catch and hold the rod $K^4$ when the latter has been moved sufficiently to throw either clutch-sleeve $I^3$ or $K^3$ from operative to inoperative position, while at the same time permitting the operator, if he so desires, to make the full throw of the rod $K^4$ by simultaneously turning and pressing downward on the handle $P^2$.

The operation of the speed regulating and reversing mechanism just described is as follows: When the handle $P^2$ is in middle position and the clutch-sleeves $I^3$ and $K^3$ are in inoperative position, as indicated in Fig. 3, the shaft H is rotated by the motor without rotating either of the clutch-wheels I or K. The pinion L, however, operates upon the planet-wheels M' M' M'. The effect produced by this is dependent on whether the brake-band wheel M on the axes $m\ m\ m$, on which the planet-wheels are mounted, is free to rotate or not. If the brake-band $M^2$ is loosened, so that the wheel M is free to rotate, then the said wheel M may be idly rotated without effect upon the internally-toothed wheel J or the sprocket-wheel H'. If, however, the brake-band be tightened, so as to prevent the rotation of the wheel M and of the axes $m\ m\ m$ of the planet-wheels with the shaft H, then said planet-wheels are merely rotated on their axes, and the internally-toothed wheel J is rotated thereby in a reverse direction to that of the shaft H, as is also the sprocket-wheel H' and the driving-axle B of the vehicle, thus running the latter backward. During this reverse operation the pawl $j^2$, carried by the internally-toothed wheel J, engages the externally-toothed ring O, which thus rotates the shaft N, &c., idly; but during the normal forward movement effected through the clutch-wheel I this toothed ring O and the parts in gear therewith are not rotated at all. If the rack-rod $K^4$ be moved to the right, Fig. 3, throwing into action the clutch-wheel I, then the sprocket-wheel H' will be directly rotated with the shaft H at the same speed as the latter. If, however, the rack-rod $K^4$ be moved to the left, so as to throw the clutch-wheel K into action instead of I, then the sprocket-wheel H' is rotated at a slower speed than the shaft H, the latter operating upon said sprocket-wheel indirectly through the counter-shaft N and toothed ring O, which latter then engages the pawl $j^2$ of the internally-toothed wheel J and carries with it the latter, together with the attached sprocket-wheel, the planet-wheels M', which are in mesh with said wheel J and also with the pinion L, rotating idly around the shaft H with the loose wheel M, as is required, the latter being only held against free rotation (by the brake-band $M^2$) when both clutches are out of action and it is desired to run backward, as already described. Thus by means of the handle $P^2$ the operator is enabled to either gear the sprocket H' for fast or slow forward motion, or, when the handle is in its middle position, to either make it run idle, or, in connection with the brake-band $M^2$, in reverse direction for backing the vehicle.

The brake-band $M^2$, as indicated in Figs. 1 and 2, is operated by means of a foot-lever $M^3$, which, as shown, is attached to a sleeve $M^4$, rotatably mounted on a conveniently-located cross-shaft R and having a flexible or chain connection to the brake-band. A second foot-lever R', similar to $M^3$, is fixed to the cross-shaft R and is connected by a chain $R^2$ to a brake-band $R^3$, which loosely incloses the brake-wheel $b'$ on the driving-axle B, thus providing for directly braking the latter. The rear axle B is driven by a chain extending from the sprocket-wheel $b$ on the axle. In order to avoid objectionable loosening of this driving-chain due to the yielding of the vehicle-springs, I carry this chain over idler-pulleys S and S', which are carried in a frame $S^2$, pivoted at $s$ to the body-sills and connected at its lower end $s'$ to a radius-arm T from the axle, thus retaining the said idlers in substantially the same position relative to the sprockets H' and $b$ and keeping the chain properly taut, notwithstanding the movement of the body relative to the axle B.

I do not desire to limit myself to the construction specifically shown and described, but wish to include such modifications as are within the spirit of my invention, as particularly pointed out in the claims.

What I claim is—

1. In a motor-vehicle the combination with a driving-axle and a motor therefor, of an intermediate shaft carrying a driving-wheel in gear with said axle, a pawl-wheel loose on said shaft and fixed to said driving-wheel, a toothed wheel having a ratchet engagement with said pawl-wheel, and separate clutch-wheels on said shaft one of which is arranged to directly operate said driving-wheel and the other of which is arranged to operate the same through said ratchet-engaged toothed wheel and an intermediate gear, substantially as set forth.

2. In a motor-vehicle the combination with a driving-axle and a motor therefor, of an intermediate shaft carrying a driving-wheel in gear with said axle, a pinion fixed to said shaft, a combined pawl and internally-toothed wheel loose thereon and fixed to said driving-wheel, planet-wheels in mesh with said pinion and internally-toothed wheel, a loosely-mounted brake wheel or drum carrying said planet-wheel, a toothed wheel having a ratchet engagement with said pawl-wheel, and separate clutch-wheels on said shaft respectively arranged to directly and indirectly operate said driving-wheel substantially as set forth.

3. In a motor-vehicle the combination with a driving-axle and a motor therefor, of an intermediate shaft having clutch-engaged wheels adjacent to opposite ends thereof and an intermediate fixed pinion, a loosely-mounted brake-drum carrying planet-wheels in mesh with said pinion, an internally-toothed wheel in mesh with said planet-wheel and carrying a ratchet-engaged exteriorly-toothed wheel, a sprocket or driving wheel fixed to said internally-toothed wheel and also to one of said clutch-wheels, and a counter-shaft in gear with the other of said clutch-wheels and also with said ratchet-engaged wheel, substantially as set forth.

4. In a motor-vehicle the combination with a driving-axle and a motor therefor, of an intermediate shaft carrying a driving-wheel in gear with said axle, mechanism on said shaft for indirectly operating said driving-wheel therefrom, said mechanism comprising separate clutch mechanisms on opposite sides of said driving-wheel, connected clutch-operating sleeves thereon, and a mechanism for operating said sleeves comprising a handled shaft in gear with said sleeves, an automatic stop to normally hold the latter in middle position, and means for releasing the same by depressing the shaft-handle while simultaneously rotating the same, substantially as set forth.

Signed by me at Reading, Pennsylvania, this 6th day of June, 1900.

HIRAM A. FRANTZ.

Witnesses:
   D. M. STEWART,
   ADAM L. OTTERBEIN.